US010521275B2

(12) United States Patent
Finnigan et al.

(10) Patent No.: US 10,521,275 B2
(45) Date of Patent: *Dec. 31, 2019

(54) ASYNCHRONOUS DISPATCHER FOR APPLICATION FRAMEWORK

(71) Applicant: Home Box Office, Inc., New York, NY (US)

(72) Inventors: Patrick Finnigan, Seattle, WA (US); Nathan J. E. Furtwangler, Kirkland, WA (US); Brendan Joseph Clark, Seattle, WA (US); Brandon C. Furtwangler, Issaquah, WA (US)

(73) Assignee: HOME BOX OFFICE, INC., New York, NY (US)

(*) Notice: Subject to any disclaimer, the term of this patent is extended or adjusted under 35 U.S.C. 154(b) by 77 days.

This patent is subject to a terminal disclaimer.

(21) Appl. No.: 15/692,055

(22) Filed: Aug. 31, 2017

(65) Prior Publication Data

US 2017/0364393 A1 Dec. 21, 2017

Related U.S. Application Data

(63) Continuation of application No. 14/803,842, filed on Jul. 20, 2015, now Pat. No. 9,753,785.

(60) Provisional application No. 62/028,374, filed on Jul. 24, 2014.

(51) Int. Cl.
G06F 9/46 (2006.01)
G06F 9/50 (2006.01)
G06F 9/48 (2006.01)

(52) U.S. Cl.
CPC .......... G06F 9/5083 (2013.01); G06F 9/4881 (2013.01)

(58) Field of Classification Search
CPC ............................ G06F 9/5083; G06F 9/4881
See application file for complete search history.

(56) References Cited

U.S. PATENT DOCUMENTS

| 5,664,103 | A | 9/1997 | Stein et al. | |
|---|---|---|---|---|
| 6,457,065 | B1* | 9/2002 | Rich | G06F 9/466 719/328 |
| 2013/0132962 | A1 | 5/2013 | De Smet et al. | |
| 2013/0297815 | A1* | 11/2013 | Ma | H04L 65/608 709/231 |
| 2014/0310713 | A1* | 10/2014 | Kaldor | G06F 9/485 718/102 |
| 2015/0347271 | A1* | 12/2015 | Payne | G06F 11/3636 717/128 |

(Continued)

OTHER PUBLICATIONS

International Search Report and Written opinion from International Patent Application Serial No. PCT/US2015/041602, dated Nov. 5, 2015, 11 pages.

(Continued)

Primary Examiner — Camquy Truong
(74) Attorney, Agent, or Firm — Amin, Turocy & Watson, LLP

(57) ABSTRACT

The described technology is directed towards an asynchronous dispatcher including control logic that manages a queue set, including to dequeue and execute work items from the queue on behalf of application code executing in a program. The dispatcher yields control to the program to allow the program and application code to be responsive with respect to user interface operations.

20 Claims, 17 Drawing Sheets

(56) References Cited

U.S. PATENT DOCUMENTS

2016/0154677 A1* 6/2016 Barik .................. G06F 13/4239
718/105

OTHER PUBLICATIONS

Newhouse, T., et al, "ALPS: An Application-Level Proportional-Share Scheduler," 2006 15th IEEE International Conference on High Performance Distributed Computing, Dated Jun. 19, 2006, pp. 279-290.

Kourai, Kenichi, et al, "Application-Level Scheduling Using AOP," Transactions on Aspect-Oriented Software Development V, Dated Jan. 1, 2009, pp. 1-44.

Mickens, James, et al, "Pivot: Fast, Synchronous Mashup Isolation Using Generator Chains," 2014 IEEE Symposium on Security and Privacy, IEEE, Dated May 18, 2014, pp. 261-275.

Office Action for U.S. Appl. No. 14/803,842 dated Jul. 28, 2016, 45 pages.

Office Action for U.S. Appl. No. 14/803,842 dated Feb. 27, 2017, 32 pages.

Notice of Allowance for U.S. Appl. No. 14/803,842 dated Apr. 28, 2017, 25 pages.

* cited by examiner

ASYNCHRONOUS DISPATCHER FOR APPLICATION FRAMEWORK

CROSS-REFERENCE TO RELATED APPLICATION

The present application is a continuation of copending U.S. patent application Ser. No. 14/803,842, filed Jul. 20, 2015, which claims priority to U.S. provisional patent application Ser. No. 62/028,374, filed Jul. 24, 2014.

BACKGROUND

Many computer-related programs benefit from asynchronous operation or multithreaded operation. As a typical example, an application's user interface (UI) input and output will not appear fluid to the user if the application blocks awaiting a relatively slow task to complete.

In a multithreaded environment, work can be done by a different thread while awaiting task completion. However, some single-threaded applications, such as those written in JavaScript®, do not provide for multithreaded operation. Further, thread switching may not be particularly efficient in many situations. Thus, thread switching may not be available or desirable for a given program or part of a program.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein executes tasks comprising asynchronous work items corresponding to those tasks by dequeuing and executing those work items on behalf of a program. After execution of one or more work items, a dispatcher that dequeues and executes the work items yields control to the program, which allows the program to be responsive with respect to user interface operations.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

Described herein is an asynchronous dispatcher that among other operations manages asynchronous callbacks, including batching work (relatively small work items) in chunks and yielding control at least at regular intervals to keep a program responsive. In one or more implementations, each batch of work is (ordinarily) completed in less time than a rendering frame takes, so that the program has enough remaining time within the frame to appear responsive, including with respect to user interface (UI) operations.

The asynchronous dispatcher may comprise a component of an application framework that supports applications, including applications written in JavaScript® or other single-threaded programming environments. Because JavaScript® applications (used herein as a non-limiting example) are single-threaded, processing asynchronous work in small batches and yielding to another program (e.g., a host web browser application executing the JavaScript® application code) at intervals allows the other program to render the application UI at a desirable rate such as sixty frames-per-second (fps) to maintain UI fluidity.

Asynchronous code management as described herein facilitates creating a JavaScript® application which, when executed by a shell (e.g., browser) that hosts and calls back the asynchronous dispatcher, is able to interact with services and input mechanisms while maintaining a responsive UI. Notwithstanding, JavaScript® code executed on a browser that hosts the asynchronous dispatcher is only one example, and other programs may invoke or include the asynchronous dispatcher in other ways.

It should be understood that any of the examples herein are non-limiting. As one example, although a single-threaded application benefits from the technology described herein, the technology is not limited to use with single-threaded applications, as multithreaded applications may similarly benefit, e.g., when thread switching is deemed inefficient. As another example, described herein is hosting a dispatcher object in browser code, however the exemplified dispatcher may be used in other ways and by other programs, and indeed, may be built into a program. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in computing and managing work items in general.

Figure 1:
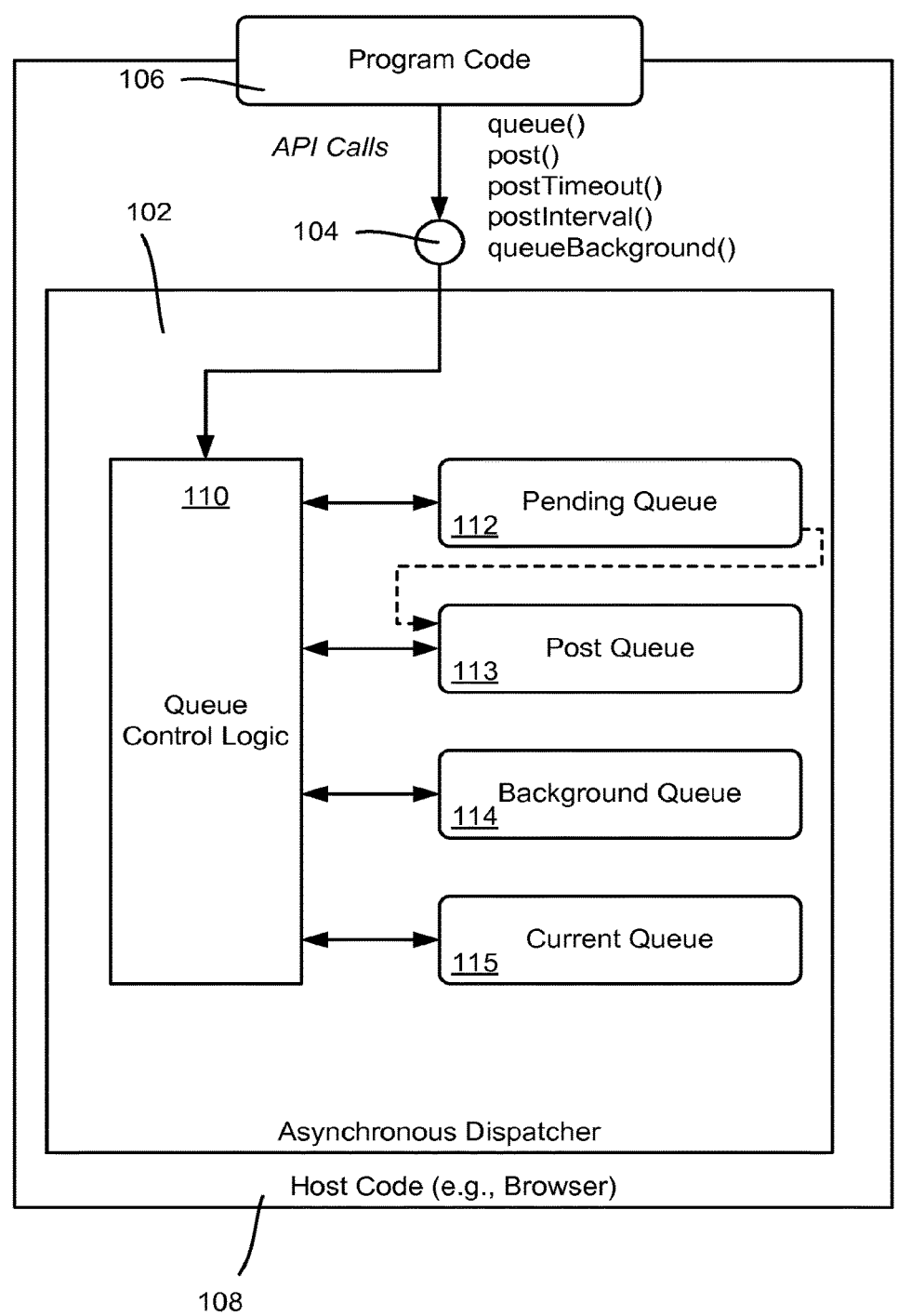
FIG. 1 is a block diagram showing an example configuration that may be used to provide an asynchronous dispatcher, according to one or more example implementations.

FIG. 1 is a block diagram of an example asynchronous dispatcher 102 that includes an interface 104 for calls and responses from program code 106, such as an application program/script (although the program code 106 may be an operating system component, middleware, and so on). As generally described herein as a useful example, the program code 106 may be run by hosting code 108 comprising a browser, whether the browser is implemented as an application or as a component of operating system code. For purposes of simplicity, the host code/program 108 may be referred to as a browser hereinafter.

In general, the interface 104 is public for use by any calling program code 106, independent of any particular platform. However it is understood that the technology described herein need not be limited to such public and/or platform-independent interfaces. In one or more implementations, the dispatcher (e.g., public) API comprises a set of methods that the program code 106 can call to dispatch asynchronous work items. One or more implementations of the API includes the following methods:

queue( )—execute a work item as quickly as possible
post( )—execute a work item on the next frame
postTimeout( )—execute a work item after a specified timeout duration
postInterval( )—execute a work item at intervals of a specified duration until canceled
queueBackground( )—execute a work item at background priority, e.g., when the dispatcher has spare cycles (e.g., no more queue or post work items waiting to be processed).

Some non-limiting examples of queue( ) work items may be work items for input handling, object rendering and so forth that need to be handled as soon as possible. Some non-limiting examples of post( ) work items may be those that are related to asynchronous operations, such as with JavaScript® promise objects. A non-limiting example of a postTimeout( ) work item may be one that changes the visible state of a rendered object after some user inaction/hovering time. Some non-limiting examples of postInterval( ) work items may be those that send data to a remote service, e.g., every minute, or send a regular heartbeat to a receiving entity. Some non-limiting examples of queueBackground( ) work items may be those that are done in anticipation of something occurring, e.g., a user may be scrolling through rendered content objects displayed on a screen, with those currently displayed having their visible content prepared and rendered by queue( ) items and those likely to be displayed soon being prepared in advance for rendering by queueBackground( ) items.

As also represented in FIG. 1, the exemplified dispatcher 102 includes one or more queues, or lists, and queue control logic 110 for managing the queues. In FIG. 1, four queues 112-115 (e.g., comprising lists) are shown, namely a pending queue 112, post queue 113, background queue 114 and current queue 115. The control and usage of these queues 112-115 are described herein, but as is understood, these queues are part of only one or more example implementations. As will be understood, such queues are only one way to accomplish a desired dispatching behavior, and non-limiting alternatives are feasible.

In general, the asynchronous dispatcher 102 operates when triggered by an event, which in one example generally described herein corresponds to the start of a regular rendering frame, e.g., frames repeating at 60 frames per second (fps) or at another rate, e.g., 30 fps, 120 fps and so on. Indeed, for purposes of clarity and simplicity herein, an example is described in which an asynchronous dispatcher operates at or near the start of each rendering frame, as long as some work needs to be done, as triggered by a callback from a hosting browser.

Notwithstanding, the asynchronous dispatcher's operation may be triggered by other events, including, for example, an external or internal timer, or upon some condition occurring, whether regularly or irregularly. As one example, a program can call back to trigger an asynchronous dispatcher both on a regular basis (e.g., the start of a frame) and when the calling program has no work to do on its own (e.g., is idle awaiting user input).

In general, when operating, the asynchronous dispatcher 102 processes items in the current queue 113, and when not operating, maintains items to be handled in the pending queue 110 and post queue 111. The asynchronous dispatcher 102 also processes background items in the background queue, e.g., when no higher priority items (e.g., those in the current queue) need to be handled. Any practical number of queues may be present in a given implementation, e.g., by having two or more background queues, by having high, medium and low priority queues, and so on.

Figure 2:
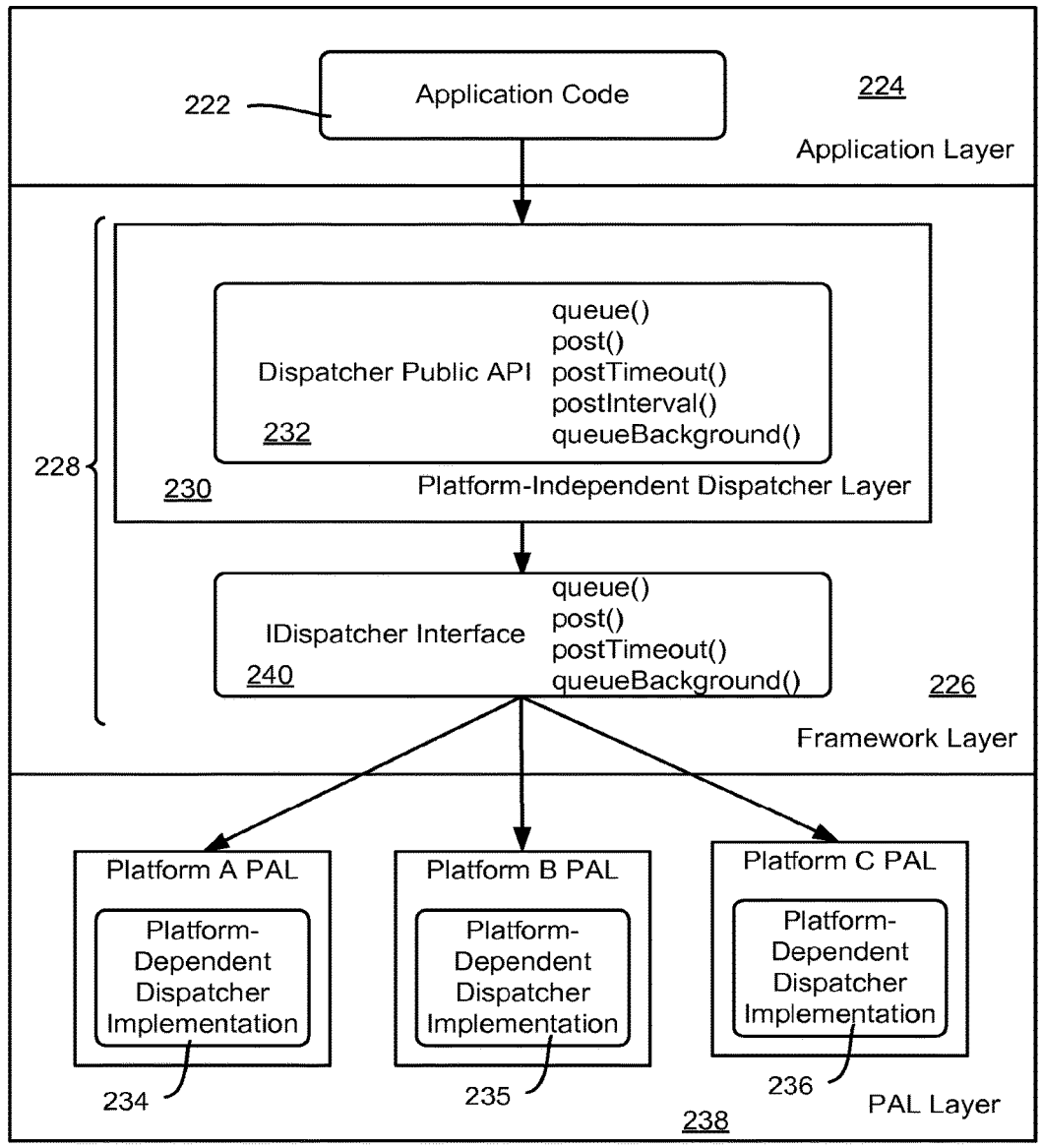
FIG. 2 is a block diagram showing an example architecture for implementation of an asynchronous dispatcher, according to one or more example implementations.

In one or more example implementations, including an implementation exemplified in FIG. 2, application code 222 in an application layer 224 calls into a framework layer 226 that includes a dispatcher 228. The exemplified dispatcher 228 comprises a platform-independent dispatcher layer 230 accessed via a dispatcher public API 232. As can be seen, a program such as a JavaScript® application thus can use the public dispatcher API 232 without needing to be concerned about platform-specific capabilities and constraints for asynchronous work item dispatches.

The platform-independent dispatcher layer 230 is configured to communicate with different platforms. To this end, beneath the framework layer 226 there is an available set of platform-dependent dispatcher implementations (e.g., 234-236), each designed for a different platform. In one implementation, a platform-appropriate one of the platform-dependent dispatcher implementations 234-236 operates in a PAL (platform abstraction layer) 238 for that given platform.

Different PAL implementations thus can tune each dispatcher implementation (e.g., 234-236) for a specific platform, (e.g., any of various desktop platforms, mobile device platforms, entertainment console platforms and so on). For example, a desktop web browser may have one platform-dependent dispatcher implementation while a mobile device browser may have another dispatcher implementation.

The exemplified PAL dispatcher implementations (e.g., 234-236) each implements a common IDispatcher interface 240 so that the platform-independent dispatcher layer 230 may comprise a single wrapper for any platform that calls into the IDispatcher methods.

As described above, the dispatcher public API 232 comprises a set of methods that the application code 222 can call to dispatch asynchronous work items. One implementation of the API 232 includes the methods described above with reference to FIG. 1, namely queue( ), post( ), postTimeout( ), postInterval( ) and queueBackground( ). However, these are only examples, and not all of these example methods may be present in a given dispatcher; similarly, other methods may be available in addition to or instead of these methods.

In the example of FIG. 2, the platform-independent dispatcher layer 228 comprises a wrapper that uses the IDispatcher interface 240 to communicate with the appropriate platform-dependent dispatcher implementation (e.g., 235) that processes work. Therefore, in this example, each of the PAL dispatcher implementations (e.g., 234-236) implement the IDispatcher interface 240. The example IDispatcher interface 240 includes the following methods:

queue( )
post( )
postTimeout( )
queueBackground( )

As can be seen, the exemplified dispatcher public API 232 methods generally map directly to the IDispatcher 240 methods of the same name. An exception is postInterval( ); no additional interface method is needed in this example, because the platform-independent dispatcher may accomplish the work at the desired interval by cyclically calling IDispatcher.postTimeout( ).

The IDispatcher interface 240 also includes a tunable property, frameWorkCutoff, comprising a time interval after which the dispatcher stops processing any more work items in the current frame. To this end, the frameWorkCutoff property is used in the PAL dispatcher implementation (e.g., 235) to determine when to stop processing work items for the current frame. Each platform may have a different frameWorkCutoff property value, which, for example, may be determined empirically or in other ways for a given platform. The frameWorkCutoff property is generally described below with reference to FIGS. 5 and 6.

With respect to the PAL dispatchers, each different platform supported by the application has a PAL dispatcher implementation, e.g., 235. Each PAL dispatcher implementation (234-236 are exemplified, however only an appropriate one is present in a given PAL) implements the IDispatcher interface 240. Thus, each PAL dispatcher implementation exposes the IDispatcher methods and properties, and also may define its own private implementation that can take advantage of the hardware and capabilities of the specific platform on which it is running. For example, some of the browser API calls/methods used by the different PAL dispatchers may be different on different platforms.

In addition to the IDispatcher implementation, other common components in each exemplified PAL dispatcher implementation may include queues/lists (e.g., those generally described above with reference to FIG. 1):
 pending queue—a sequential list containing work items that are to be executed as quickly as possible
 post queue—a sequential list containing work items that are to be executed on the next frame
 background queue—a sequential list containing work items that are to be executed at background priority
 current queue—a sequential list containing work items to attempt to execute in the current frame, or if not in the current frame then as quickly as possible, e.g., in the next frame.

Each IDispatcher implementation, such as the implementation 235 which will be referenced hereinafter, also may be described with reference to the following concepts (e.g., described in FIGS. 5 and 6):
 onTick—a work item processing routine (generally run by the queue control logic 108 of FIG. 1/each dispatcher implementation 234, 235 or 236 of FIG. 2)
 isEmpty—a condition in which the pending queue, post queue, background queue, and current queue contain zero work items.

By way of example, consider a web browser PAL dispatcher implementation, e.g., 235. One platform for which the PAL dispatcher may be implemented is a generic desktop web browser platform as the calling host code 108 (FIG. 1) or application code 222 (FIG. 2). The web browser PAL dispatcher implementation 235 can take advantage of the web browser platform as follows:
 postTimeout( )—the web browser's root window object provides a setTimeout( ) method to execute a callback after a specified duration, so postTimeout( ) can simply wrap this. The window's clearTimeout( ) method can be used if the posted callback needs to be canceled.
 Frame callback—the web browser's root window object provides a requestAnimationFrame( ) method that can be used to schedule the PAL dispatcher's onTick routine to run on the next frame. It can be used to efficiently yield to the browser after the time spent by the PAL dispatcher doing work in the frame crosses the frameWorkCutoff threshold. This way, the PAL dispatcher is assured to get called back to finish processing remaining work while yielding to the browser regularly to keep the browser UI responsive to the user.
 setImmediate( )—the web browser provides a setImmediate( ) method that allows a callback to run immediately without waiting for the next frame. The PAL dispatcher can leverage this to execute work immediately, typically if queue( )/queueBackground( ) is called when the dispatcher is empty; (the isEmpty condition is met).

As is understood, PAL dispatcher implementations for other platforms may need to use different native scheduling APIs.

Figure 3A:
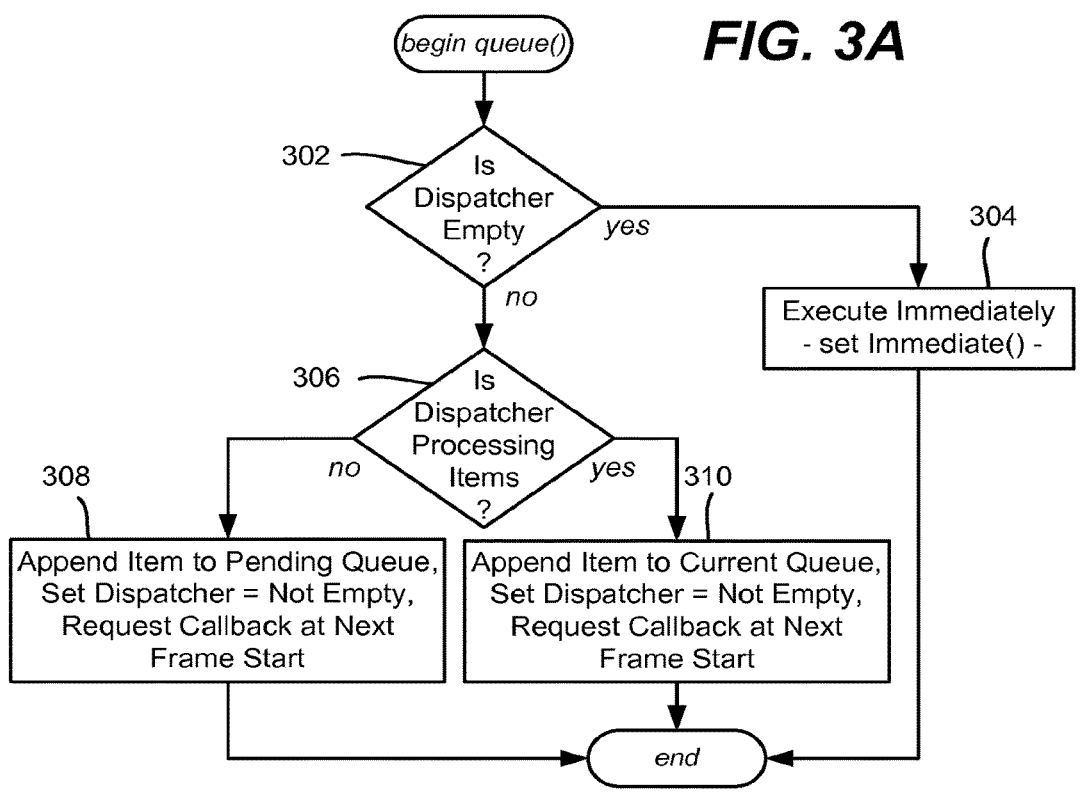
FIG. 3A is a flow diagram showing example steps that may be taken upon receiving a queue work item, according to one or more example implementations.
Figure 3B:
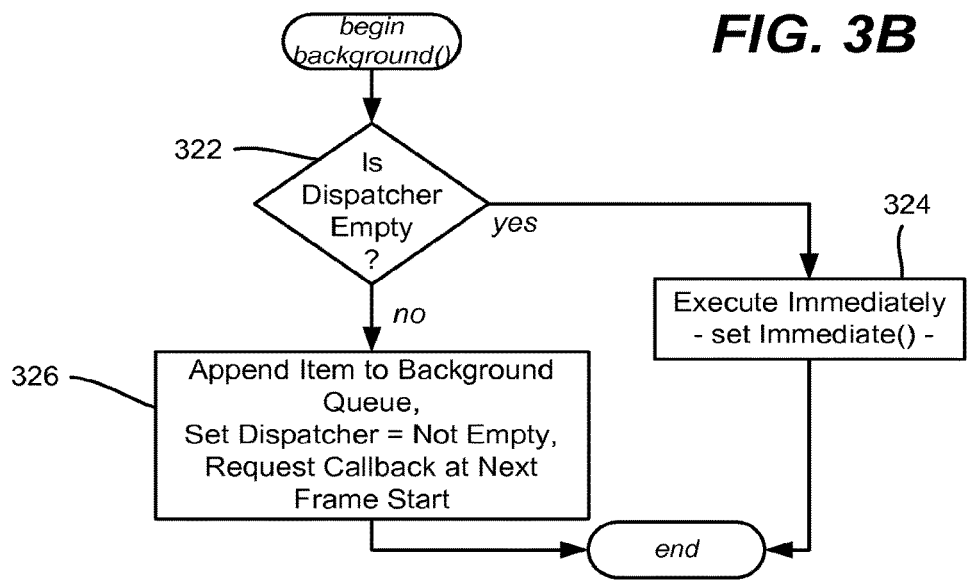
FIG. 3B is a flow diagram showing example steps that may be taken upon receiving a background work item, according to one or more example implementations.
Figure 4:
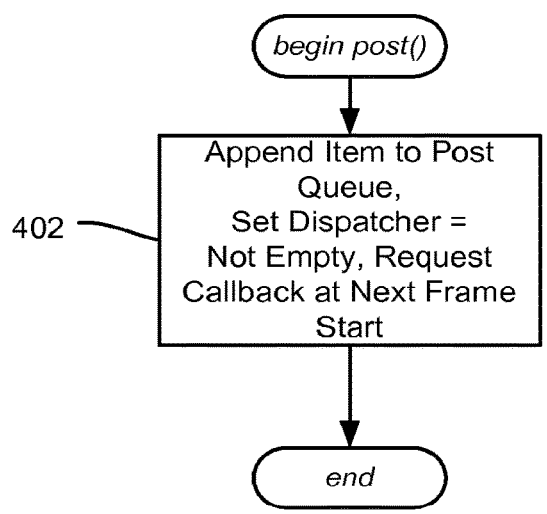
FIG. 4 is a flow diagram showing example steps that may be taken upon receiving a post work item, according to one or more example implementations.

Turning to FIGS. 3A, 3B and 4, the IDispatcher implementation methods interact with these internal components:
 queue( )—appends the passed work item to pending queue if onTick is not currently processing work; appends the passed work item to current queue if onTick is processing work.
 post( )—appends the passed work item to the post queue
 postTimeout( )—uses a platform-native timer to execute the passed work item after the given timeout has elapsed
 queueBackground( )—appends the passed work item to the background queue The queue( ) method is represented in FIG. 3A, which when called, checks the dispatcher empty or not empty state, that is, the isEmpty condition, at step 302. If empty, the dispatcher 235 may take advantage of the native immediate scheduling mechanism, e.g., the setImmediate( ) method of a web browser in this example. To this end, the web browser provides the above-described setImmediate( ) method that allows a callback to run immediately without waiting for the next frame. The PAL dispatcher 235 can thus leverage this method to execute work immediately via step 304 if queue( ) is called when the dispatcher's queues are empty.

If not empty at step 302, the queue( ) method's operation depends on whether the dispatcher is in a state in which it is currently processing items, e.g., whether the onTick routine is presently processing work items in the PAL dispatcher's queues; this is evaluated at step 306. If not, at step 308 the dispatcher 235 appends the new work item provided in the queue( ) method call to the pending queue.

Figure 5:
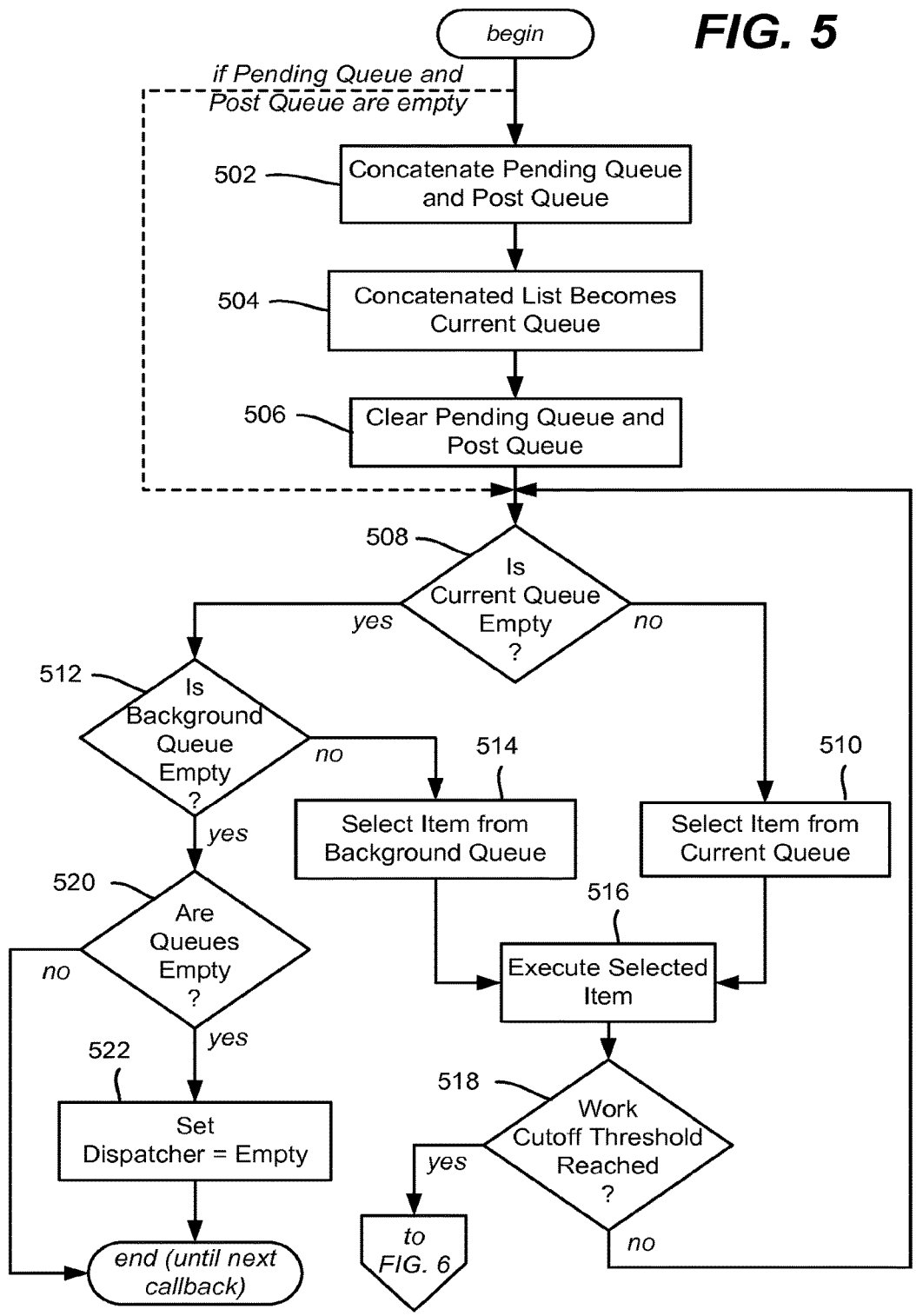
FIGS. 5 and 6 comprise a flow diagram showing example steps that may be taken by a work item processing routine to dequeue and execute work items in a manner that yields control to a program, according to one or more example implementations.
Figure 6:
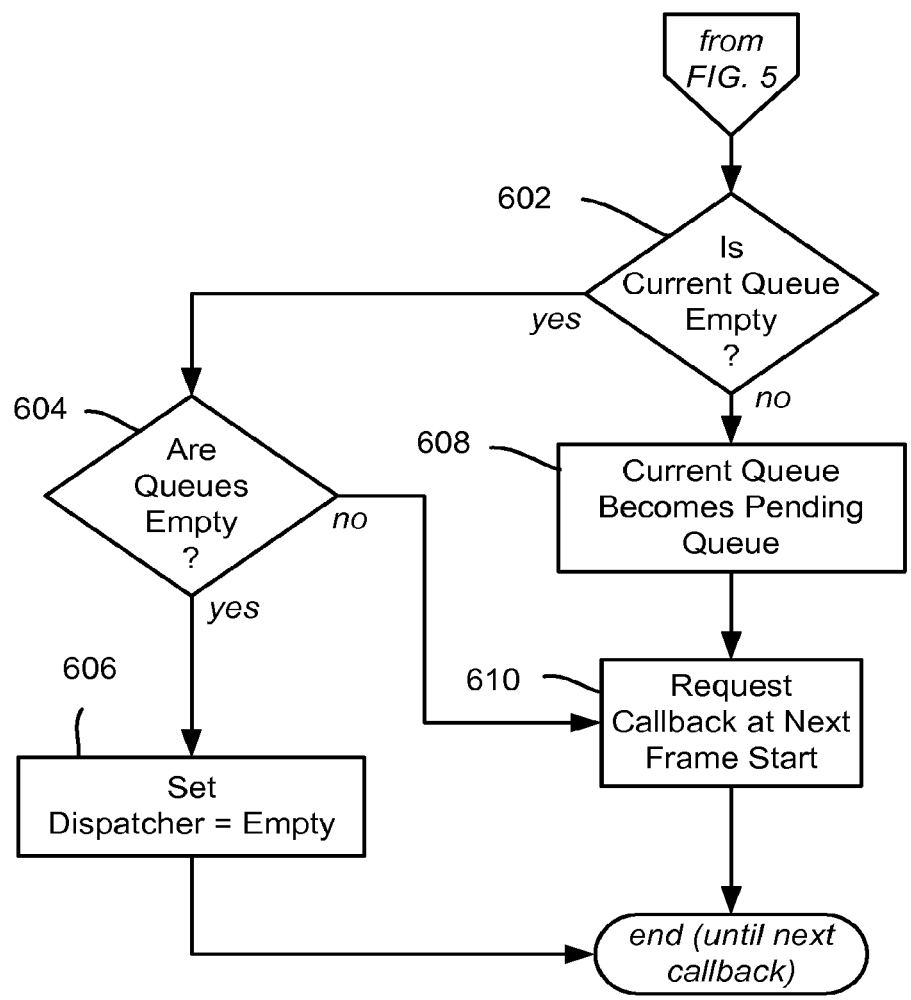

If currently processing items, at step 310 the dispatcher 235 appends the work item to the current queue (which as will be understood from FIGS. 5 and 6, is the primary queue that is accessed during the onTick routine). Again, since an item is being queued, the queue( ) method ensures that the dispatcher state is set as not empty, which the dispatcher can change when appropriate.

Note that whenever an item is appended to a queue, the respective method ensures that the dispatcher state is set as not empty (unless and until the dispatcher later changes the state after emptying the queues), and that a callback is going to occur next frame, e.g., by calling the browser's requestAnimationFrame( ) method. This is because if the dispatcher's queues are empty at the completion of processing items, the work item processing routine (onTick) does not request the browser to trigger the dispatcher on the next frame.

The queueBackground( ) method is represented in FIG. 3B, which when called, checks the dispatcher empty or not empty state, that is, the isEmpty condition, at step 322. If empty, the dispatcher 235 uses the above-described setImmediate( ) method that allows a callback to run immediately without waiting for the next frame. The PAL dispatcher 235 can thus leverage this method to execute work immediately via step 324 if queueBackground( ) is called when the dispatcher's queues are empty.

If not empty at step 322, at step 326 the dispatcher 235 appends the new background work item provided in the queueBackground( ) method call to the background queue. Note that this occurs regardless of whether the dispatcher is currently processing items. Again, because an item is being queued, the queueBackground( ) method ensures that the dispatcher state is set as not empty (which the dispatcher can change when appropriate), and that a callback is going to occur next frame.

FIG. 4 describes the post( ) method call, summarized at step 402 where the item is appended to the post queue, the dispatcher state is changed to not empty and a callback is requested. Note that because the item is a post( ) item, the caller has indicated that execution is not desired until (at least) the next frame, and thus this item is not immediately executed even if the queues are otherwise empty.

In some situations, setImmediate( ) may not always be desirable or available when the dispatcher is empty. In such a situation, the post( ) method often may be used. However, setImmediate( ) also may need to be bypassed (or may be unavailable in a particular hosting browser or the like) for a queue( ) or queueBackground( ) item. If so, it can be readily understood that the respective queue( ) or queueBackground( ) method may be adjusted so that the item can be queued instead of immediately executed. Thus, if setImmediate( ) is not used for queue( ) or queueBackground( ) when the dispatcher is empty, the operation of FIG. 4 is applicable for a queue( ) or queueBackground( ) item, except the item is appended to the pending queue or the background queue, respectively; (note that because the queues are empty, the dispatcher would not be processing items via the onTick routine and thus the current queue is irrelevant at this time).

The above-described methods refer to a single item being queued per method call. However, as can be readily appreciated, it is a feasible alternative for multiple work items to be included in a single call. It is also feasible for a work item (or multiple work items as a group) to be associated with a queue type (e.g., pending, post or background), so that a single method call (e.g., queue(work item, queue type)) may be used instead of a different method call for each type of queue.

Another feasible method is one by which an item may be removed from a queue without being executed, e.g., the background queue. For example, consider that an application has requested a content object be rendered in anticipation of its being needed, e.g., as the user is scrolling through content items. If a user scrolls to the point where that object needs to be prepared and rendered right away but the background item that would have prepared (e.g., fetched content for) this object has not yet been processed, a queue( ) work item (or set of work items) is more appropriate, and is thus sent to the dispatcher. The corresponding background( ) work item is thus no longer needed, and can be removed without processing it again. Another example when a remove method may be used is when a work item that was queued (or posted, or put into the background queue) is no longer needed, e.g., because the user navigates to another page or performs some other action that makes the work item unnecessary.

FIGS. 5 and 6 represent example logic that may be used in the item processing state of the dispatcher, e.g., when the work item processing routine processes work items queued in the PAL dispatcher. The exemplified onTick routine's role is to execute work items serially until the frame is "full," meaning that if any further work were to be processed in the frame, it may risk causing the application to appear unresponsive. That is, the onTick routine wants to leave some time for the browser/application code to do some processing, including any UI updating and preparing more work items for the dispatcher.

To this end, in one or more implementations, the onTick routine keeps the application responsive by yielding execution control within each frame as soon as the frameWorkCutoff temporal threshold is crossed; (e.g., after a work item that has been started before the frameWorkCutoff threshold was crossed finishes). If the PAL dispatcher is not empty when frameWorkCutoff is crossed, then onTick schedules a callback for itself on the next frame to continue processing the remaining work items.

In one or more implementations, the onTick routine maintains a strict ordering of work item execution order. At the beginning of each frame, as represented at step 502 of FIG. 5, the pending queue and post queue are combined (e.g., concatenated together with the pending queue coming first). The combined list comprising the pending queue and post queue becomes the current queue (which is initially empty) at step 504, and the pending queue and post queue are cleared at step 506. Note that the queues need not be actually copied into another queue and then cleared, but instead can be managed by manipulating references/changing queue variable values that point to each queue data structure. Further, note that steps 502, 504 and 506 may be skipped if there are no items in the pending queue and post queue.

Step 508 evaluates whether the current queue is empty, which is possible if only background queue items are present, for example. If however there was at least one pending queue or post queue item, the current queue is not empty, whereby step 510 selects (dequeues) the (first) item from the current queue. Step 516 executes the selected work item.

Step 518 evaluates whether the work cutoff time threshold is reached, (which for example can be detected via a timer initialized at the start of the onTick routine). If not, the process returns to step 508 to select the next item from the current queue, if any, for execution. As can be seen in FIG. 5, the routine continues looping to select and execute items from the current queue until none remain (step 508) or the cutoff time threshold is reached (step 518).

Turning to the "yes" branch at step 508, if the current queue is initially empty or has become empty, step 512 evaluates whether the background queue is also empty. If also empty, there is nothing left to process this frame, and thus the dispatcher will end until the next callback. However, before ending, the dispatcher checks at step 520 whether the entire dispatcher is empty, including the post( ) queue which may have had items added while processing the current queue. If empty, step 522 sets the dispatcher to the isEmpty condition as described herein. The onTick routine then ends until the next callback.

If at step 512 the background queue is not empty, step 514 selects (dequeues) the item from the background queue, after which it is executed at step 516. Upon completion of the work item, step 518 again checks the cutoff threshold time. If not reached, the routine returns to step 508 to determine if a new item has been added to the current queue (e.g., via step 310 described above), selecting and executing the newly queued item if so at steps 510 and 516, or if not, again checking the background queue for items (step 512) to execute.

Turning to step 518, in many instances the cutoff threshold will be reached while processing one of the queued items. In this situation and in this example, step 518 branches to step 602 of FIG. 6 where the queues are evaluated to determine whether they are empty.

If the current queue is empty at step 602, then step 604 is executed to evaluate whether the other queues are also empty. If so, the dispatcher state variable (IsEmpty) is set at step 606 to reflect this condition, and the dispatcher yields execution control back to the program without requesting the callback. If at least one item is queued in any queue, step 604 branches to step 610 to request a callback at the start of the next frame.

If the current queue is not empty at step 602, any item or items remaining in the current queue are assigned to the pending queue (step 608); (the current queue becomes the pending queue). Step 610 is executed to ensure that another triggering callback will occur at the next frame start so that the pending queue items, any post queue items and/or background queue items will be processed to the extent possible. Note that post( ) work items that were in the current queue are essentially promoted to the pending queue, which is appropriate because such items are intended to be processed as soon as possible once the current frame has begun, but in this situation were unable to be processed in the current frame and need to be processed as soon as possible beginning with the next frame.

It should be noted that in the above example logic, a callback to trigger the dispatcher may be requested (e.g., at step 310 of FIG. 3) even though the queues are emptied by the dispatcher thereafter. This not problematic, as triggering the dispatcher onTick routine with empty queues will simply return right away. Notwithstanding, other techniques may be used to ensure that there is never a situation in which an item is queued but no callback is requested and/or to minimize or eliminate callbacks in situations where no work items are queued.

As can be seen, the exemplified onTick routine serially executes items from the current queue, and then whenever empty, serially executes items from the background queue, until the frameWorkCutoff threshold is crossed or no work items remain in the current queue or the background queue. Any queue( ) calls that occur while onTick is processing items cause items to be appended to the end of the current queue as described above with reference to step 310 of FIG. 3. If the PAL dispatcher is not empty when frameWorkCutoff is crossed, then items remaining in the current queue are saved to the pending queue before execution control is yielded, so as to execute on the next frame. If the current queue becomes empty before the frameWorkCutoff threshold is crossed, then items from the background queue are processed in order, (assuming no new queue( ) item(s) are added while executing a background item since a queue( ) item takes precedence over the next background item), until the frameWorkCutoff threshold is reached or no items remain. This way, outstanding work items dispatched via queue( ) or post( ) are executed before outstanding work items dispatched via queueBackground( ), (except for post( ) items queued after the start of a frame, since those are intended to be executed in the next frame).

In general, the work items are arranged by the calling application to be relatively small and fast to operate. For example, consider a task in which a string needs to be fetched and parsed to look for a condition, after which some action is taken based upon the condition being met or not met while parsing. Such a task may take a long time or undetermined amount of time to complete, and thus the application may divide the task up into work items, e.g., a work item to request the string, followed by a work item to parse the string after the fetch request completes at the application, followed by a work item to run logic to determine the action to take, followed by a work item that takes the action. Further, the parsing work item may be divided, e.g., only some maximum number of characters can be parsed at a time. In this way, a task can be handled by a number of asynchronous work items, allowing other asynchronous tasks to be handled (by similarly queuing those other tasks as work items) without having to wait for another task to fully complete.

Figure 7:
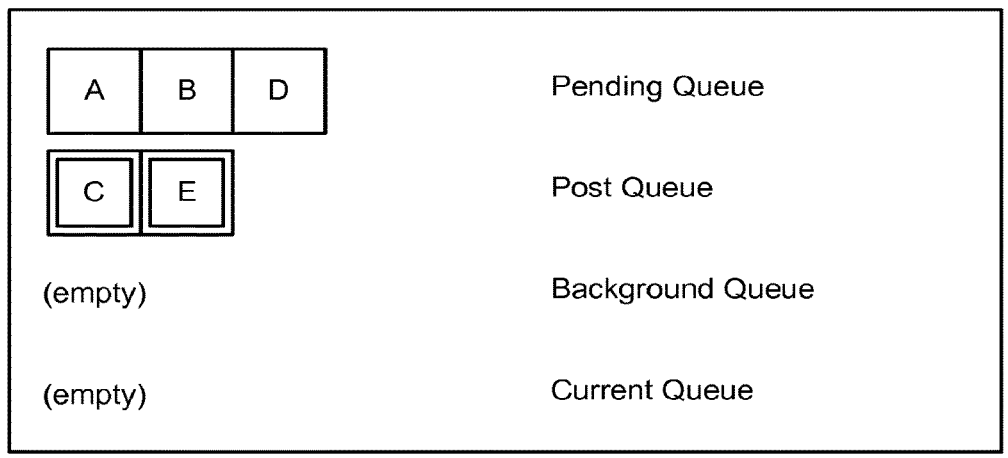
FIGS. 7-16 are example representations of how queued work items may be executed over time, including within a sequence of rendering frames, according to one or more example implementations.
Figure 7:
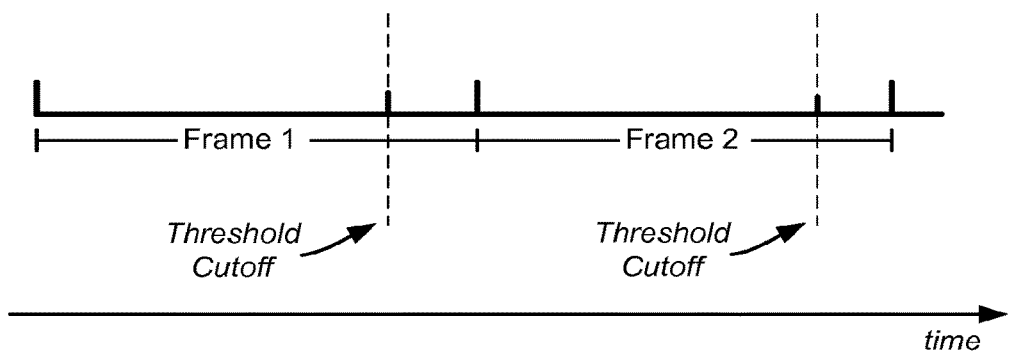

Turning to an example PAL dispatcher execution flow, consider the following examples states that illustrate one such flow as represented in FIGS. 7-16. FIG. 7 shows an initial state (for some example frame 1). The pending queue starts out with three work items (A, B, and D) that were added via queue( ), which are shown as single rectangles. The post queue starts out with two work items (C and E) that were added via post( ); post items are shown in FIGS. 7-16 as outlined (double) rectangles. For purposes of explanation in this example flow, the alphabetical order of the work item names indicates the chronological order in which they were added via the dispatcher's queue( )/post( )/queueBackground( ) methods.

Figure 8:
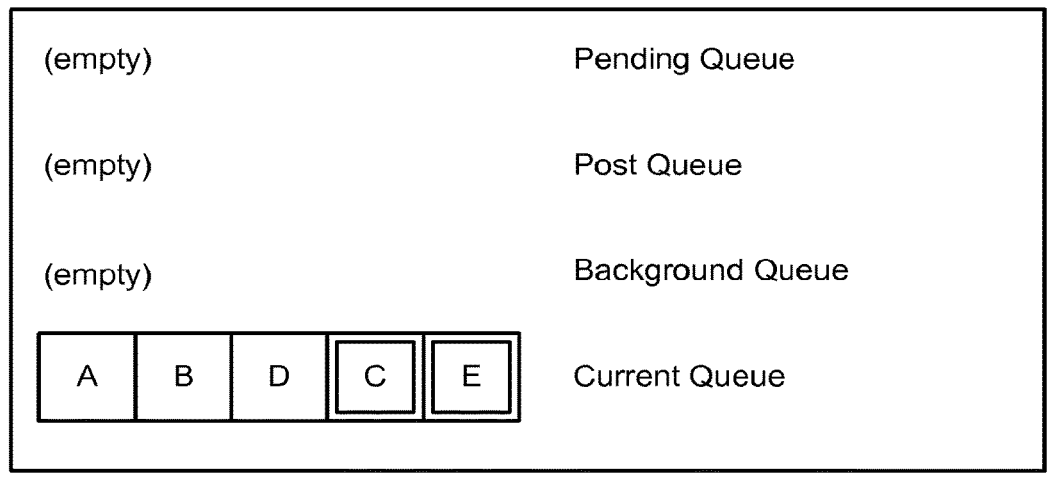
Figure 8:
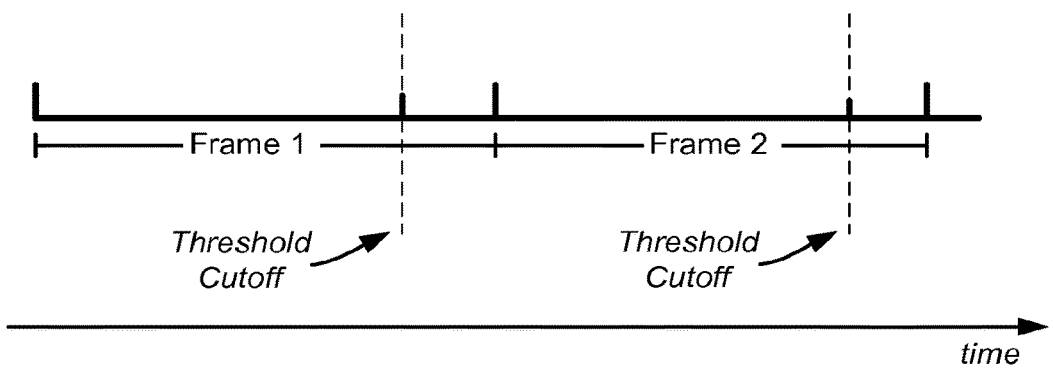

FIG. 8 represents when the PAL dispatcher's "onTick" routine begins. The pending queue and post queue are concatenated to form the current queue (A, B, D, C, E) and then both the pending queue and post queue are cleared. This corresponds to steps 502, 504 and 506 of FIG. 5, described above.

Figure 9:
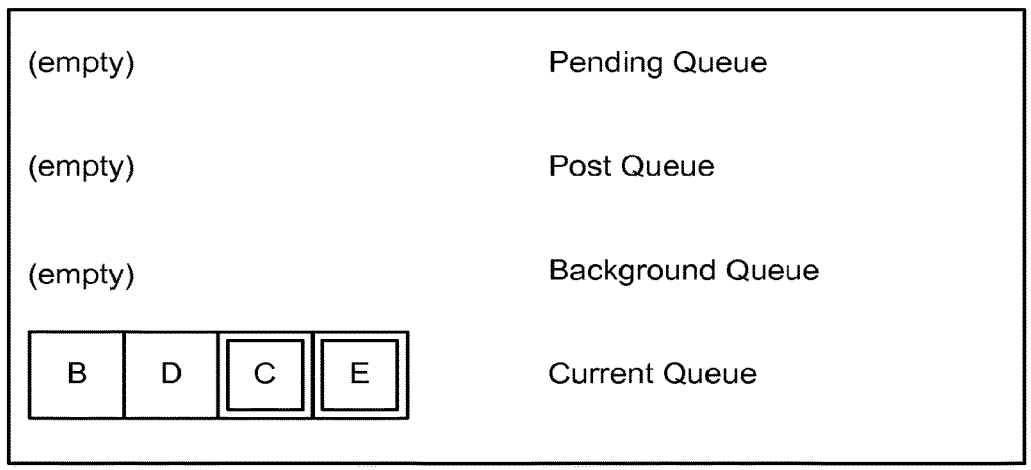
Figure 9:
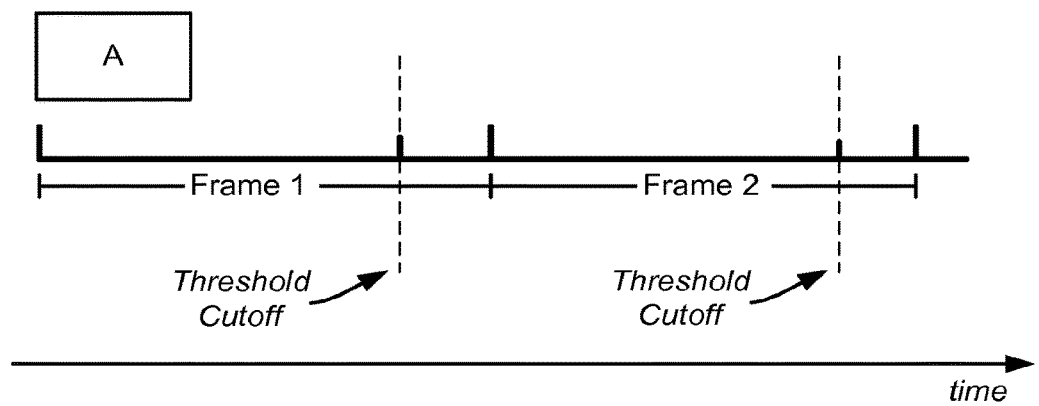

In FIG. 9, work item A is dequeued (removed) from the current queue and executed. This corresponds to steps 510 and 516 of FIG. 5, described above.

Figure 10:
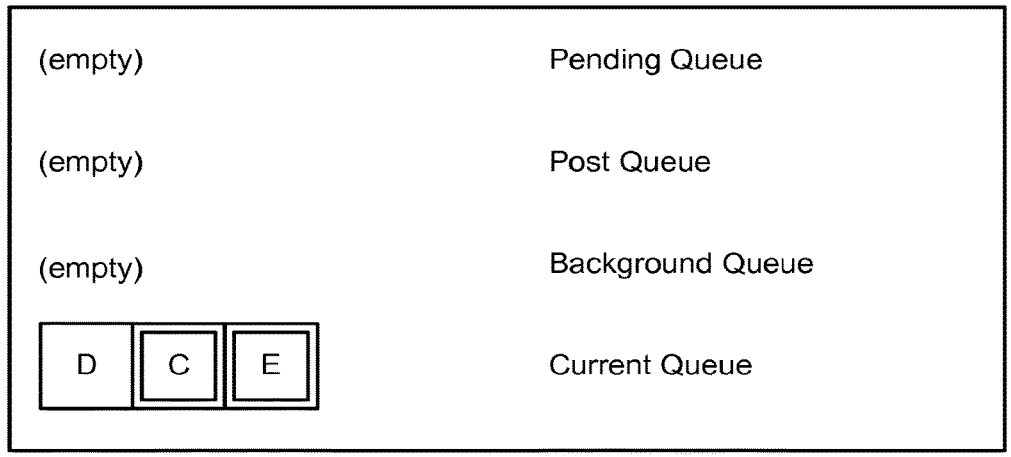
Figure 10:
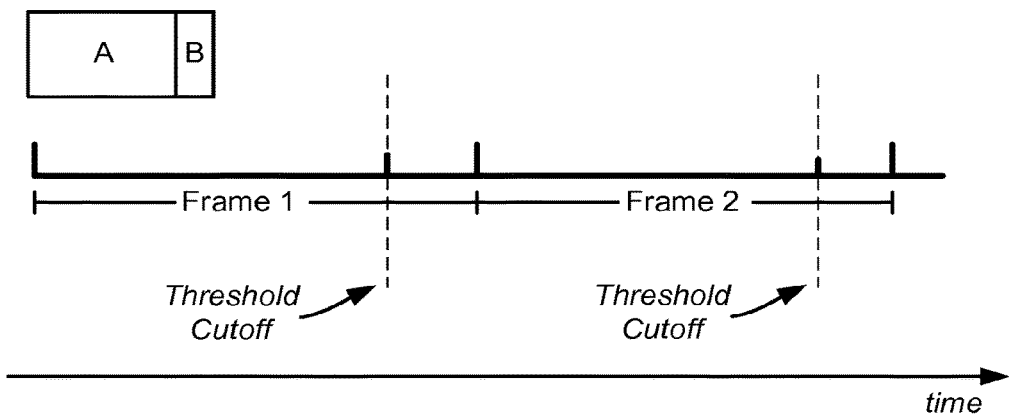

In FIG. 10, work item B is dequeued from the current queue and executed. Note that work item B takes less time to complete than did work item A. To represent this, note that the relative "execution time" of a work item within each frame is reflected in the relative horizontal width of the rectangles (or hexagons); thus work item A can be seen as taking longer than work item B. This execution time may not be known in advance when queued, and thus items when in a queue are represented in FIGS. 7-16 as the same size, comprising squares for queue( ) items, outlined squares for post( ) items, or regular hexagons for background queue( ) items. However, it should be understood that the relative rectangle/hexagon widths are only for purposes of showing that work items may differ in execution time, and that the horizontal width of any item is not intended to accurately reflect its actual time with respect to the frames that are depicted in FIGS. 7-16.

Figure 11:
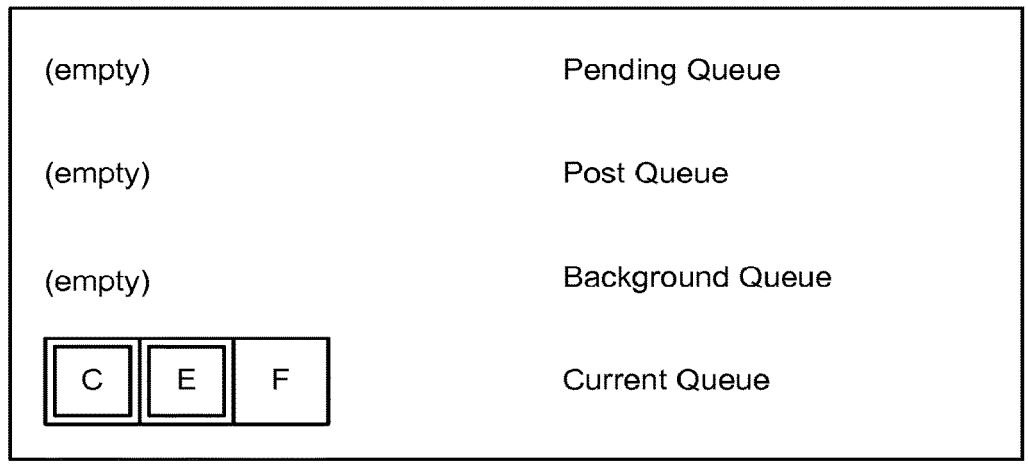
Figure 11:
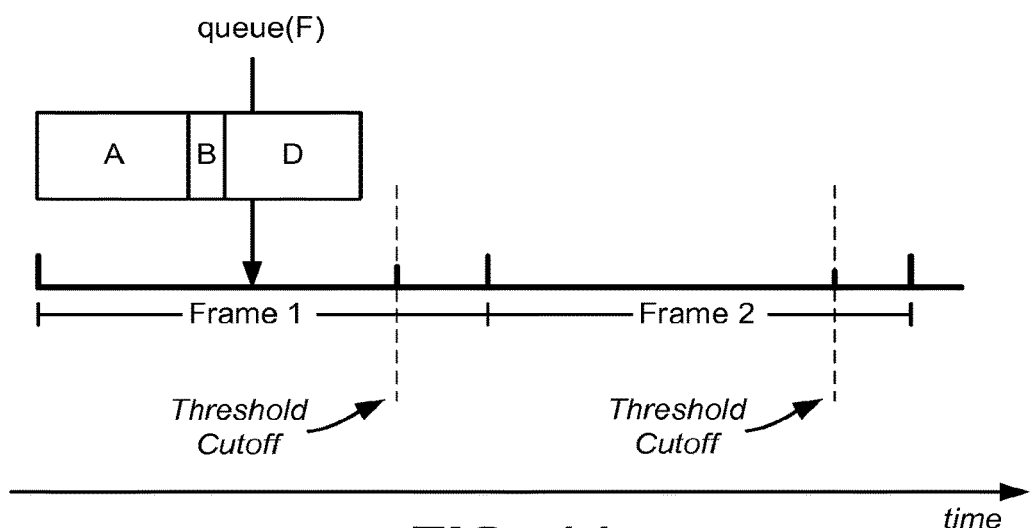

In FIG. 11, work item D is removed from the current queue and executed. While work item D is running, a queue( ) call to Dispatcher.queue( ) for a new work item F comes in. Because onTick is currently processing, F is appended to the current queue (step 310). Item F, which is a queue ( ) and thus high priority item, is added to the queue after the post( ) items C and E. This is because post( ) items are considered to be an "execute as soon as possible on the next frame" priority and are essentially promoted to queue priority when they are concatenated onto the pending queue to form the current queue (steps 502 and 504) on the next frame. However in an alternative implementation, it is feasible to process queue( ) item F before the post( ) items C and E.

Figure 12:
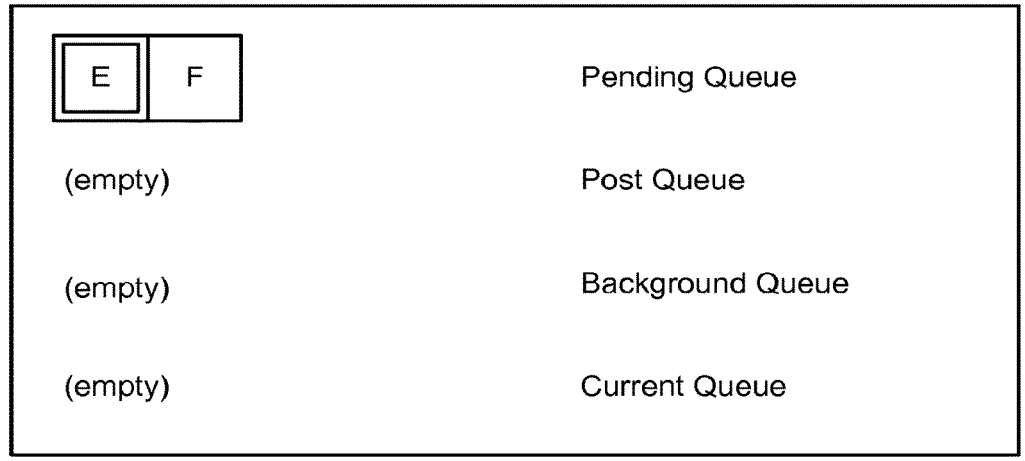
Figure 12:
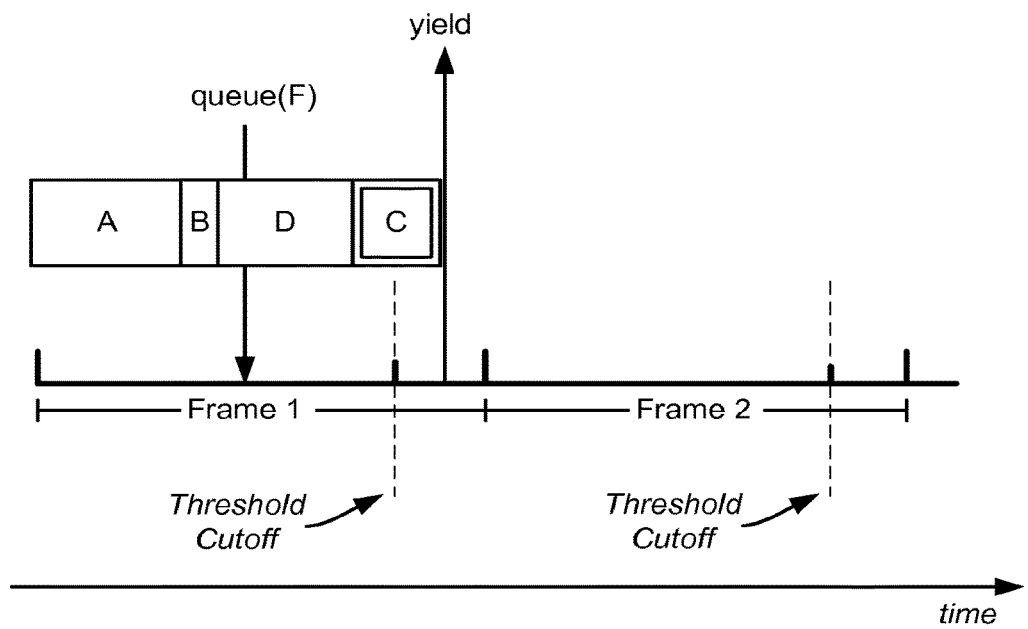

In FIG. 12, work item C is removed from the current queue and executed. After C has finished executing, the accumulated duration (total time) of work item processing in this frame has exceeded the frameWorkCutoff threshold, and thus control is yielded from onTick. The current queue, containing items E and F, gets saved to the pending queue, and the current queue gets cleared. A callback is requested because the pending queue is not empty.

Figure 13:
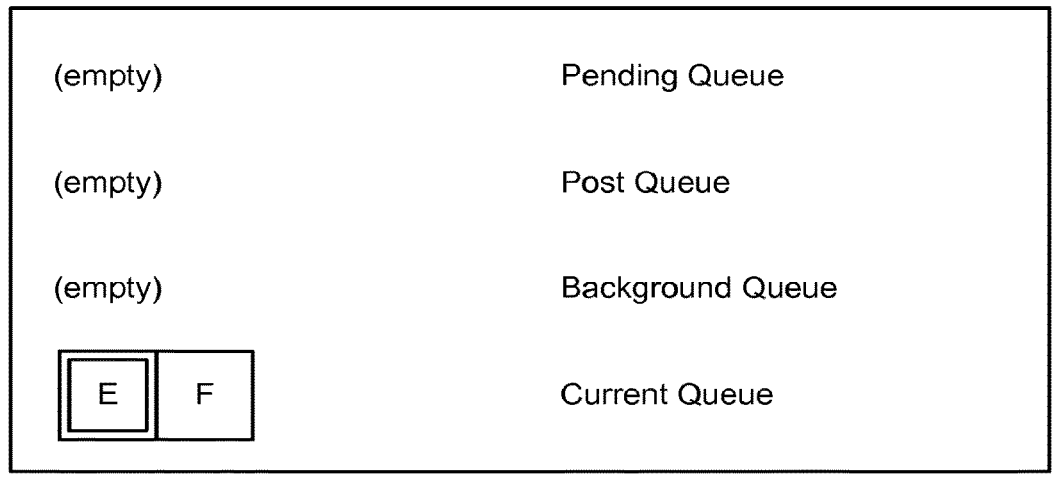
Figure 13:
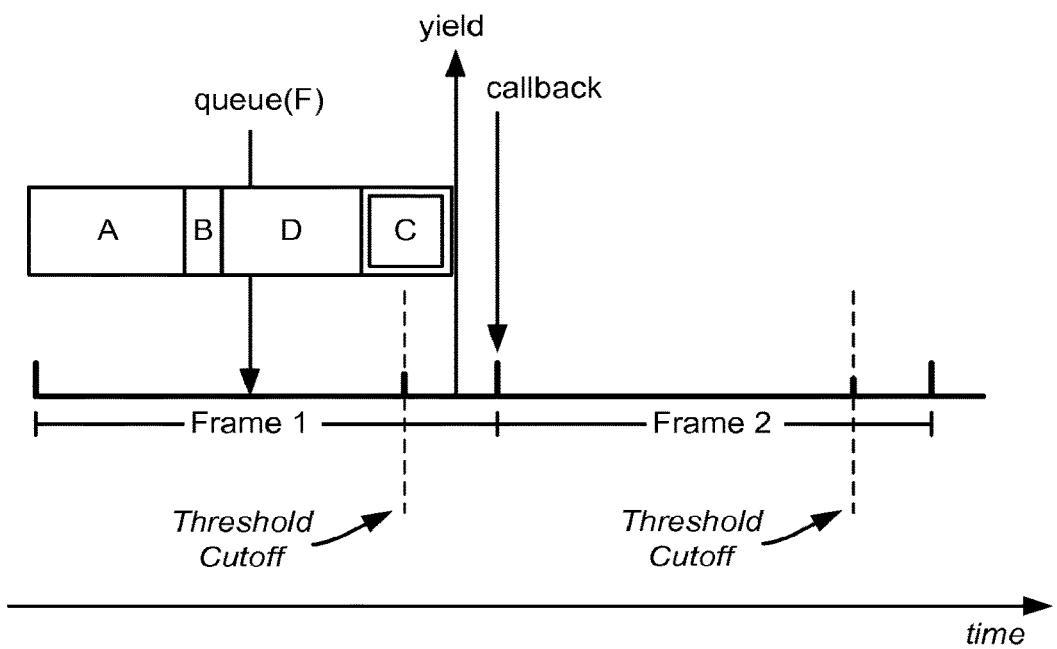

In FIG. 13, "onTick" gets called back from the requested callback for the next frame, Frame 2 in this example. The pending queue and post queue are concatenated to form the current queue and then both the pending queue and post queue are cleared.

Figure 14:
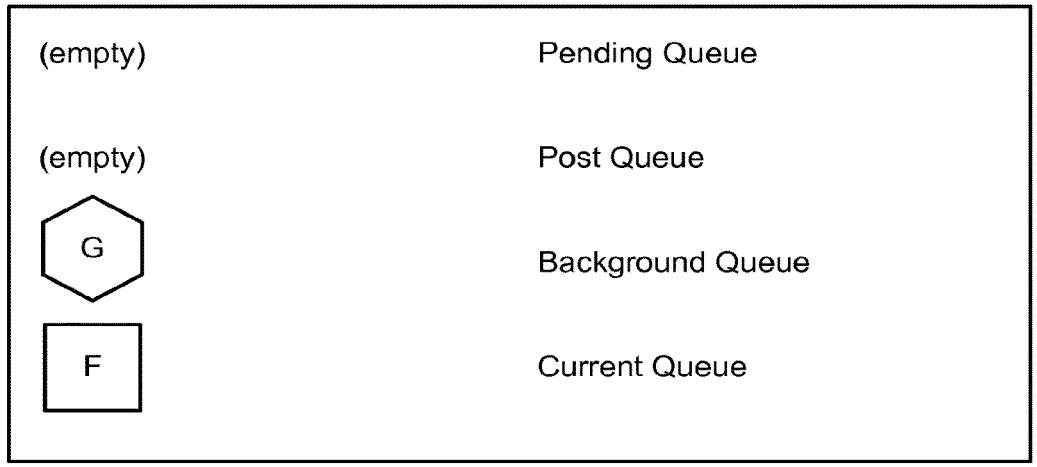
Figure 14:
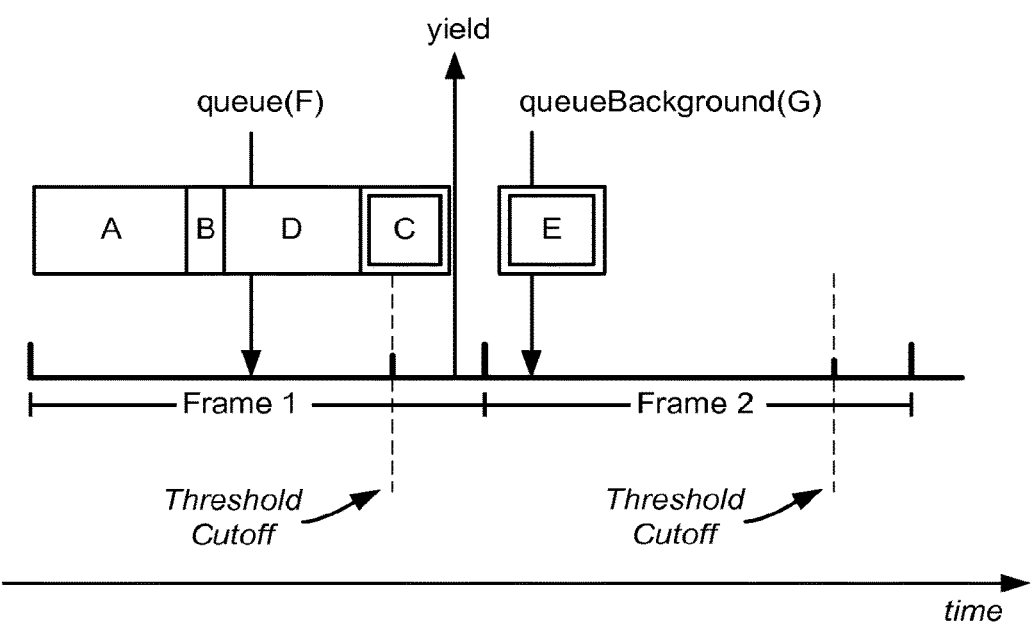

In FIG. 14, work item E is removed from the current queue and executed. While work item E is running, a call to Dispatcher.queueBackground( ) for a new work item G comes in. G is appended to the background queue.

Figure 15:
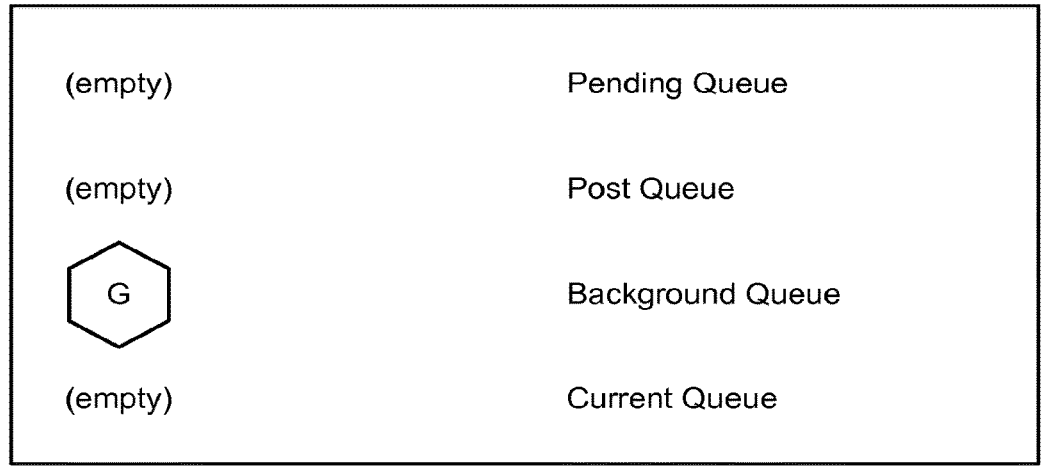
Figure 15:
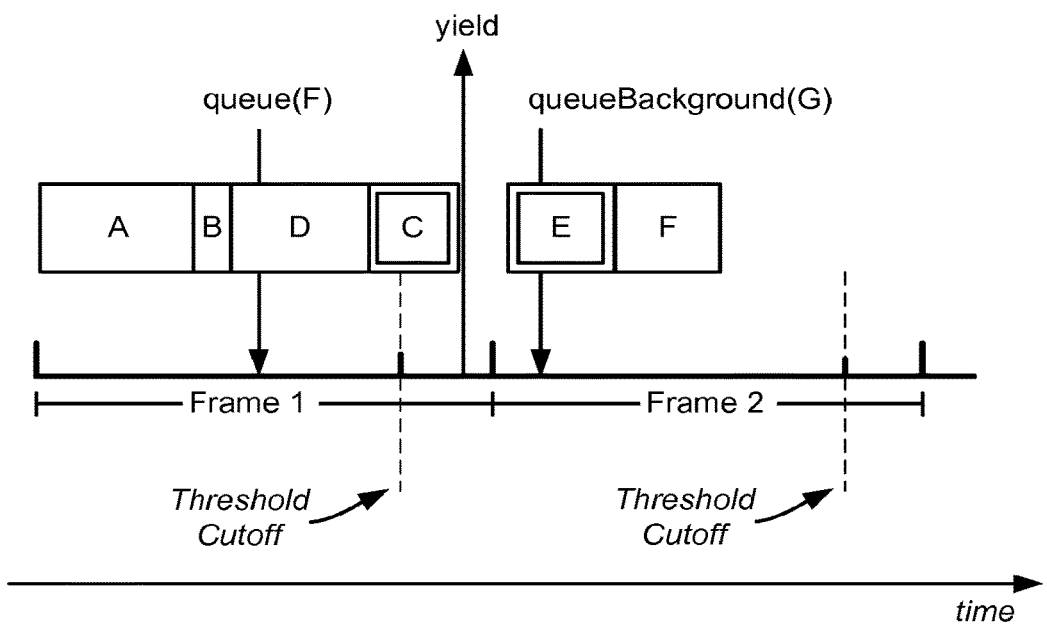

In FIG. 15, work item F is removed from the current queue and executed. The current queue is now empty.

Figure 16:
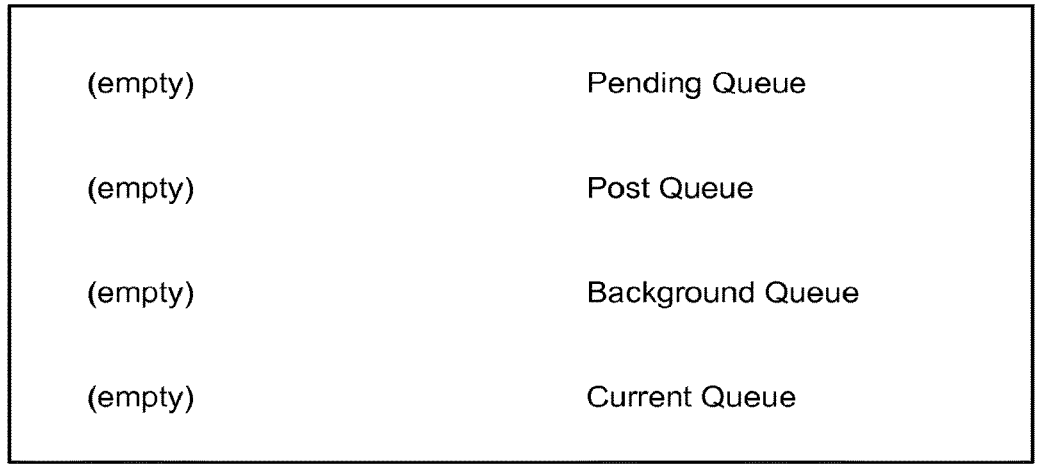
Figure 16:
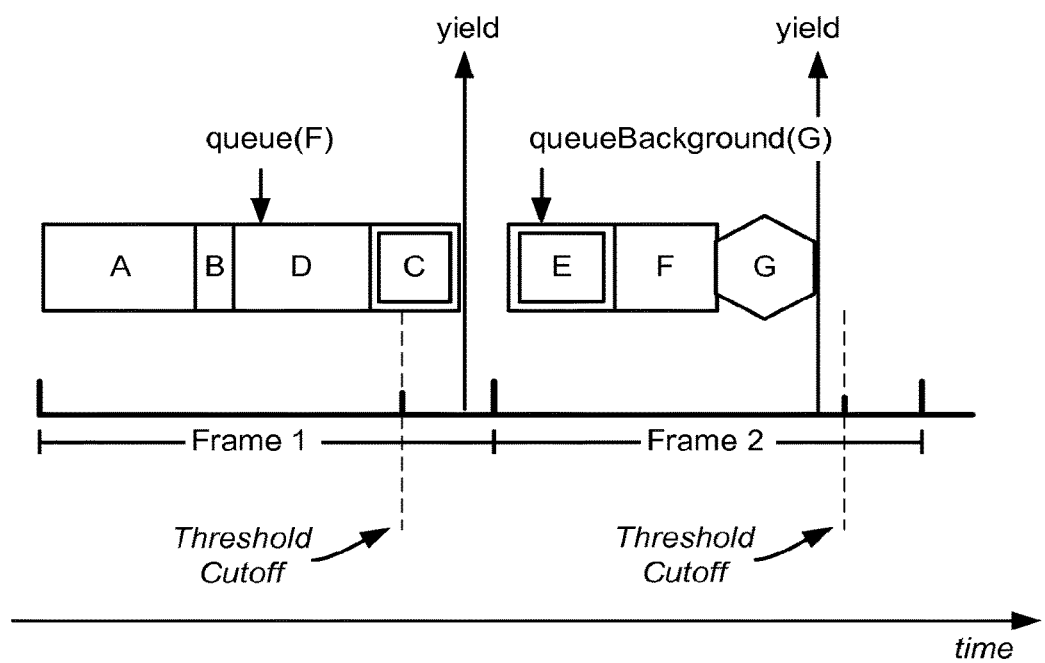

In FIG. 16, because the current queue is empty, an item in the background queue can be processed. Work item G is removed from the background queue and executed. The background queue is also now empty. Because the current queue and background queues are both empty, control is yielded even though the accumulated duration of work items has not yet exceeded frameWorkCutoff.

Various alternatives and enhancements are feasible. For example, consider that the frameWorkCutoff time may be adjusted for different circumstances. Indeed, the frameWorkCutoff time is designed as a variable to have its value set per platform-dependent dispatcher implementation, which may be determined empirically and then set for each implementation. However, as one example alternative, if an application is capable of providing an actual frame rate to the dispatcher, the dispatcher may adjust the frameWorkCutoff time within the same platform-dependent dispatcher implementation (e.g., 30 fps provides far more time for work items than 60 fps, and if this frame rate is variable and provided to the dispatcher, the frameWorkCutoff time may be adjusted accordingly).

As another alternative, the frameWorkCutoff time may be dynamically adjusted. Consider, for example, that the last work item tends to be completing very close to the next frame start and thus possibly not giving the browser or other code enough time to function properly (or even sometimes going past the start of when the next frame should begin). This situation may be detected by the dispatcher by checking the actual time the last work item completes relative to the frameWorkCutoff time. If a "very-short-time-remaining" situation or an "exceeded-the-frame-length" situation occurs too often, then the frameWorkCutoff threshold may be decreased dynamically. Conversely, the amount of time between ending the onTick routine because of reaching the frameWorkCutoff and the next callback can be measured; if significant time exists, (e.g., because the browser has a lower frame rate than the dispatcher expects but the browser cannot report the actual rate), then the frameWorkCutoff threshold may be increased dynamically.

As another alternative, consider that work items may be associated with metadata that indicates an estimated (or even actual) completion time. Such metadata may be gathered from actual measurements, estimates, statistics, heuristics, and so forth. For example, with such metadata, the dispatcher can skip over an item that will (actually or probably) take too long to complete within the remaining frame time relative to the frameWorkCutoff, e.g., do not start an item that will finish execution later than the frameWorkCutoff plus X. As a more particular example, consider that (e.g., from measured statistics) one type of work item is considered as fast, another type of work item as medium and yet another type of work item as slow. For one given frame, the dispatcher may determine that only a statistically fast item will complete within the frameWorkCutoff plus X; any medium or slow items are thus skipped over until the next frame, even if a fast background item is substituted, that is, even if the fast work item is a background work item and the medium and slow work items are queue( ) or post( ) work items. For another given frame, the dispatcher may determine that a statistically medium or fast item will complete within the frameWorkCutoff plus X, and thus skip any slow items until the next frame.

Further, given the metadata, the dispatcher can schedule item execution to maximize throughput within the allotted time. Using the statistically slow, medium and fast items example from above, the dispatcher may schedule three slow items, two medium items and two fast items for the current frame.

Note that skipping over/scheduling work items assumes that work items can be processed in any order. Some tasks may need work items to depend on an ordering, e.g., prepare visible content to render in work item A, and render the content in subsequent work item B. Additional metadata may be used to indicate whether it is safe to vary the order of work items.

As another alternative, instead of having separate queues, various alternative priority mechanisms may be used. As but one example, consider a single queue with items tagged as pending, post or background items, which are dequeued accordingly (items may be tagged in a way that allow for even more priority levels).

For example, given the above-described pending, post or background work item scheme, similar results may be generally obtained by having queue items queued in a single queue as Q items, post items queued as N items (for next frame), and background items as queued as B items. With such a scheme, the single queue is the current working queue. In a first queue walk, only Q items are executed, with N items changed to Q items but not executed. In one or more subsequent queue walks, Q items (which include any N items changed to Q items) are again handled, along with any newly added Q items; however any newly added N items are neither executed nor changed to Q items in the subsequent walk or walks. B items are only handled when there are no Q items. At the end of the dispatcher routine (which may include more than two queue walks), whether ended by threshold time cutoff or no remaining Q or B items, any N items are changed to Q items for execution in the next frame. As is understood, (although likely less efficient in many situations due to the multiple walks and skipping over items), in such a single queue scheme, pending items are handled first, followed by post items that existed before the start of the frame along with newly added pending items, and then background items. Post items that were queued after the start of the frame are not executed until the next frame.

In a variant of this scheme, two queues may be used, comprising one queue for pending items and post items and another queue for background items. Such a scheme may be more efficient in terms of the amount of queue space needed, e.g., the background items may accumulate but not get processed because pending/post work items keep coming in, whereby the single queue traversal time suffers because of the walk to find pending/post items spends a lot of time walking over background items.

As can be seen, there is described an asynchronous dispatcher that manages asynchronous application code execution. The asynchronous dispatcher allows a single-threaded (e.g., JavaScript®) application framework to maintain responsiveness while efficiently managing asynchronous callback scheduling.

One or more aspects include an asynchronous dispatcher coupled to a queue set comprising at least one queue. The asynchronous dispatcher includes control logic that manages the queue set, including to dequeue and execute work items from the queue set on behalf of application code running in a program, and to yield control to the program to allow the program and application code to be responsive, e.g. with respect to user interface operations.

The control logic generally attempts to yield control to the program on each rendering frame by being configured to not execute a work item after a threshold cutoff time that is prior to an end-of-frame time boundary is reached, and by being configured to yield control to the program after completion of a last-executed work item in that rendering frame. The application code may comprise a single-threaded application, e.g., written in JavaScript®. The program may be a browser that hosts the asynchronous dispatcher and that executes the application code.

The asynchronous dispatcher may include a first component having public methods that are independent of a platform and a second component comprising a platform-dependent dispatcher implementation that contains the control logic. The queue set may comprise a pending queue, a post queue, and a background queue, and the public methods may include a first method for queuing at least one item in the pending queue, a second method for queuing at least one item in the post queue, and a third method for queuing at least one item in the background queue. The public methods may include a method for executing a work item after a specified timeout duration, and another method for executing a work item at intervals of a specified duration.

In an implementation in which the queue set comprises a pending queue, a post queue and a background queue, the control logic may attempt to dequeue and execute any work items that exist in the pending queue and the post queue at the start of a frame, before the control logic attempts to remove and execute any work items from the background queue in the frame. The control logic may dequeue and execute items from a current queue comprising work items from the pending queue and the post queue at the start of the frame, and if any non-executed work items remain in the current queue before the control logic yields control, may queue the non-executed work items in the pending queue for processing in a next frame.

One or more aspects are directed towards determining whether a work item exists in a queue set comprising at least one queue, and if so, dequeuing the work item. Upon executing the work item, one or more aspects are directed towards determining whether to yield control to a program, and if so, returning to the program, and if not, continuing to dequeue and execute work items.

The queue set may comprise a current queue having zero or more pending work items and zero or more post work items that are previously queued, and a background queue having zero or more background work items. Determining whether a work item exists in the queue set may comprise evaluating the current queue for a work item, and if empty, evaluating the background queue (and as long as the current queue remains empty during the background queue processing, returning to the current queue if a new work item is added).

Control may be yielded to the program upon determining that no work item is queued in the current queue or the background queue. Pending work items and post queue work items may be combined into a current queue at the start of a work item processing routine. A new pending item may be received during the work item processing routine, and queued into the current queue. A new post item received during the work item processing routine is queued into the post queue for dequeuing and executing in a later work item processing routine.

Control may be yielded to the program based upon evaluating a total processing time within a frame time against a threshold cutoff time within the frame time. If the threshold cutoff time is reached, control is yielded.

One or more aspects are directed towards combining a pending queue and a post queue into a current queue, and if the current queue is not empty, dequeuing and executing one or more work items from the current queue until the current queue is empty or a cutoff time is reached. If the current queue is empty and the background queue is not empty, one or more work items are dequeued and executed from the background queue until the background queue is empty or the cutoff time is reached. Control is yielded to a program when the current queue is empty and the background queue is empty. When the current queue and background queue are not both empty and the cutoff time is reached, any work items in the current queue are assigned to the pending queue and control is yielded to a program.

If a new pending item is received while executing a work item processing routine, the new pending item may be queued into the current queue; if the new pending item is received after executing the work item processing routine, the new pending item may be queued into the pending queue. If a new background item is received, the new background item may be queued into the background queue. If new post item is received, the new post item may be queued into the post queue. Also described is requesting a callback from the program when the current queue and background queue are not both empty before control is yielded.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 17 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 17:
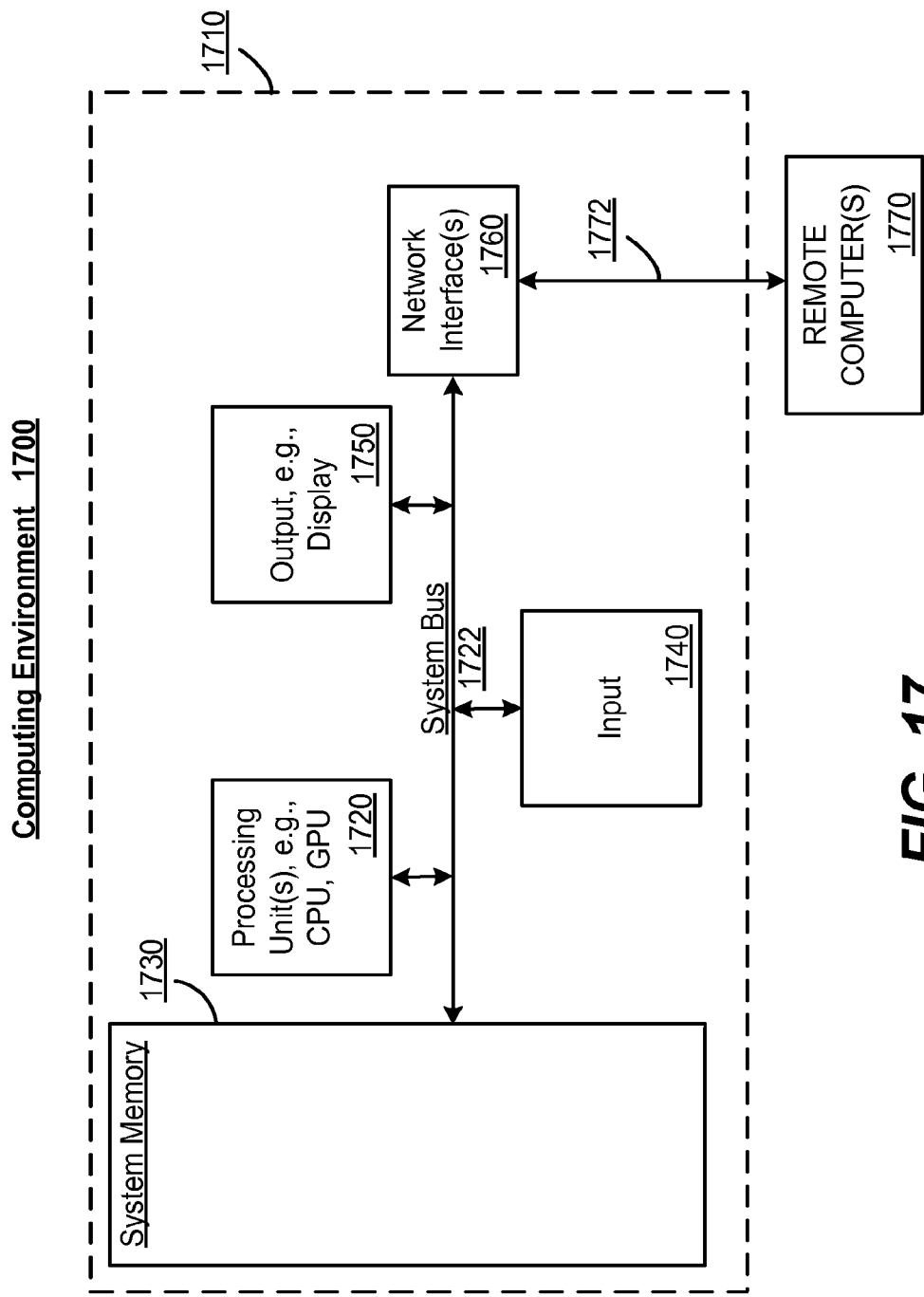
FIG. 17 is a block diagram representing an example computing environment into which aspects of the subject matter described herein may be incorporated.

FIG. 17 thus illustrates an example of a suitable computing system environment 1700 in which one or aspects of the implementations described herein can be implemented, although as made clear above, the computing system environment 1700 is only one example of a suitable computing environment and is not intended to suggest any limitation as to scope of use or functionality. In addition, the computing system environment 1700 is not intended to be interpreted as having any dependency relating to any one or combination of components illustrated in the example computing system environment 1700.

With reference to FIG. 17, an example device for implementing one or more implementations includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of machine (e.g., computer) readable media and can be any available media that can be accessed by a machine such as the computer 1710. The system memory 1730 may include computer storage media in the form of volatile and/or nonvolatile memory such as read only memory (ROM) and/or random access memory (RAM), and hard drive media, optical storage media, flash media, and so forth. By way of example, and not limitation, system memory 1730 may also include an operating system, application programs, other program modules, and program data.

A user can enter commands and information into the computer 1710 through one or more input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a processor; and
   a memory communicatively coupled to the processor, the memory having stored therein computer-executable instructions, comprising:
      an asynchronous dispatcher, the asynchronous dispatcher coupled to a queue set comprising at least one queue, wherein the asynchronous dispatcher is configured to:
         dequeue and execute work items from the queue set on behalf of application code running in a program within a rendering frame; and
         in response to at least one work item remaining in the queue set after a threshold cutoff time that is prior to an end-of-frame time boundary of the rendering frame, yield execution control to the program, and schedule a callback from the program to the asynchronous dispatcher to dequeue and execute the at least one work item at the start of a next rendering frame.

2. The system of claim 1, wherein the application code comprises a single-threaded application.

3. The system of claim 1, wherein the application code is written in JavaScript®.

4. The system of claim 1, wherein the program comprises a browser that hosts the asynchronous dispatcher and that executes the application code.

5. The system of claim 1, wherein the asynchronous dispatcher includes a first component having independent operations that are independent of a platform and a second component having dependent operations that are dependent on the platform.

6. The system of claim 5, wherein the queue set comprises a pending queue, a post queue, and a background queue, and wherein the independent operations are selected from the group consisting of: addition of a work item to the pending queue, addition of the work item to the post queue, and addition of the work item to the background queue.

7. The system of claim 5, wherein the independent operations are selected from the group consisting of: execution of a work item after a specified timeout duration, and execution of a work item at an interval of a specified duration.

8. The system of claim 1, wherein the queue set comprises a pending queue, a post queue and a background queue.

9. The system of claim 8, wherein the asynchronous dispatcher is configured to dequeue and execute work items from a current queue comprising work items from the pending queue and work items from the post queue at the start of the rendering frame, and in response to work items remaining in the current queue before the execution control is yielded to the program, to queue the work items remaining in the pending queue for processing in a later rendering frame.

10. A method comprising:
   in response to determining within a rendering frame that at least one work item exists in a queue set comprising at least one queue, dequeuing and executing, by a system comprising a processor via an asynchronous dispatcher, a work item of the at least one work item on behalf of application code running in a program; and
   in response to determining at least one work item remaining in the queue set after a threshold cutoff time that is prior to an end-of-frame time boundary of the rendering frame, yielding, by the asynchronous dispatcher, execution control to the program, and scheduling, by the asynchronous dispatcher, a callback from the program to the asynchronous dispatcher to dequeue and execute the at least one work item at the start of a next rendering frame.

11. The method of claim 10 wherein the queue set comprises a current queue having zero or more pending work items combined with zero or more post work items that were previously queued, and a background queue having zero or more background work items and wherein the determining at the start of the rendering frame whether at least one work item exists in the queue set comprises evaluating the current queue for work items, and if empty, evaluating the background queue for work items.

12. The method of claim 11, further comprising, combining pending work items and post queue work items into the current queue at the start of the frame.

13. The method of claim 10, further comprising determining the threshold cutoff time based upon a historical amount of time between completing a last work item in the at least one queue and a start time of a next frame.

14. The method of claim 11, further comprising, receiving a new pending work item during the dequeuing and executing, and queuing the new pending work item into the current queue.

15. The method of claim 11, further comprising, receiving a new post queue work item during the dequeuing and executing, and queuing the post queue work item into the post queue for dequeuing and executing during a later rendering frame.

16. A non-transitory machine-readable media having machine-executable instructions, which when executed by a processor perform operations, comprising:
   in response to determining within a rendering frame that at least one work item exists in a queue set comprising at least one queue, dequeuing and executing, by an asynchronous dispatcher, a work item of the at least one work item on behalf of application code running in a program; and
   in response to determining at least one work item remaining in the queue set after a threshold cutoff time that is prior to an end-of-frame time boundary of the rendering frame, yielding, by the asynchronous dispatcher, execution control to the program, and scheduling, by the asynchronous dispatcher, a callback from the program to the asynchronous dispatcher to dequeue and execute the at least one work item at the start of a next rendering frame.

17. The non-transitory machine-readable media of claim 16, the operations further comprising determining the threshold cutoff time based upon a historical amount of time between completing a last work item in the at least one queue and a start time of a next frame.

18. The non-transitory machine-readable media of claim 16, wherein the application code comprises a single-threaded application.

19. The non-transitory machine-readable media of claim 16, wherein the application code is written in JavaScript®.

20. The non-transitory machine-readable media of claim 16, wherein the program comprises a browser that hosts the asynchronous dispatcher and that executes the application code.

\* \* \* \* \*